United States Patent [19]

Scherer et al.

[11] Patent Number: 4,758,663
[45] Date of Patent: Jul. 19, 1988

[54] ISOINDOLINE COMPOUND

[75] Inventors: Hans Scherer, Weisenheim; Wolfgang Lotsch, Beindersheim; Gustav Bock, Neustadt, all of Fed. Rep. of Germany

[73] Assignee: BASF Aktiengesellschaft, Ludwigshafen, Fed. Rep. of Germany

[21] Appl. No.: 486,010

[22] Filed: Apr. 18, 1983

Related U.S. Application Data

[63] Continuation of Ser. No. 971,060, Dec. 19, 1978, abandoned.

[30] Foreign Application Priority Data

Dec. 24, 1977 [DE] Fed. Rep. of Germany ....... 2757982

[51] Int. Cl.$^4$ ........................................... C07D 403/14
[52] U.S. Cl. ..................................... 544/284; 544/300
[58] Field of Search .......................................... 544/284

[56] References Cited

U.S. PATENT DOCUMENTS 3,646,033  2/1972  Leister et al. ...................... 544/284
3,923,806  12/1975  Bock et al. ......................... 544/300
3,987,045  10/1976  Bock et al. ......................... 544/300
3,991,054  11/1976  Bock et al. ......................... 544/300

Primary Examiner—Glennon H. Hollrah
Assistant Examiner—James H. Turnipseed
Attorney, Agent, or Firm—Oblon, Fisher, Spivak, McClelland & Maier

[57] ABSTRACT

Isoindoline compounds of the formula

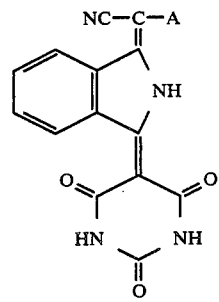

where A is —CN or

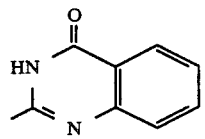

These compounds are pigments which give brilliant and deep colorations, of good fastness, in plastics and surface coatings.

1 Claim, No Drawings

ISOINDOLINE COMPOUND

This is a continuation of application Ser. No. 971,060, filed Dec. 19, 1978, now abandoned.

The present invention relates to novel isoindoline compounds of the formula

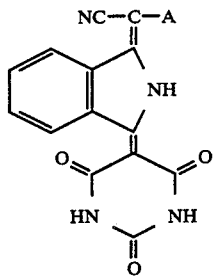
(I)

where A is cyano or

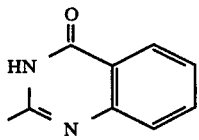

The novel compounds are pigments which in plastics, especially in thermoplastics such as rigid PVC, polyethylene, polypropylene, polystyrene, polyacrylates, polymethacrylates, copolymers of styrene, acrylonitrile, butadiene and/or acrylic acid esters, and plasticized PVC, give lightfast, brilliant and deep colorations. In surface coatings, deep brilliant colorations which are lightfast in the range near the pure shade are obtained.

The colorations obtained are yellow if A is cyano and red if A is the quinazolone radical.

The novel compounds (I) are prepared by stepwise condensation of 1-amino-3-iminoisoindoline with the appropriate cyanomethylene compound and then with barbituric acid:

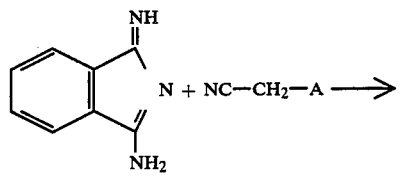
(II)

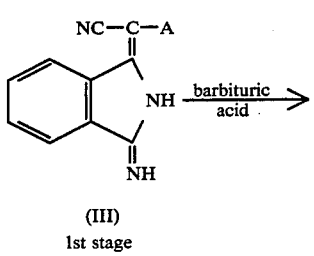
(III)
1st stage

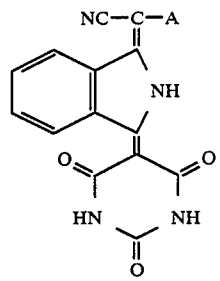
(I)
2nd stage

The compounds may be prepared, for example, in accordance with the process described in German Laid-Open Application DOS 1,670,748. Alternatively, they may be prepared by the process described in German Patent Application P 27 57 982.4, in the presence of water, or in water. Depending on the conditions of preparation, the compounds of the formula I may be obtained in pigmentary forms which give high-hiding or transparent colorations.

The Examples which follow illustrate the invention.

EXAMPLE 1

64 parts of o-phthalodinitrile are suspended in 400 parts of ethylene glycol and the suspension is treated with 15 parts of ammonia gas for 3 hours at 60° C. The resulting solution of 1-amino-3-iminoisoindoline is run into a suspension, brought to pH 9 and kept at 60° C., of 64 parts of barbituric acid and 93 parts of 2-cyanomethylquinazol-4-one in 750 parts of water, and stirring is continued for 2 hours at 60° C. The reaction mixture is then brought to pH 3 with sulfuric acid and is stirred for a further 2 hours at pH 3 and 60° C. 16 parts of oleic acid ethanolamide are then added, the mixture is heated to 90° C. and the product is filtered off and dried. 150 parts of a red pigment which has a high tinctorial strength and possesses good dispersibility in plastics are obtained. The pigment has the formula

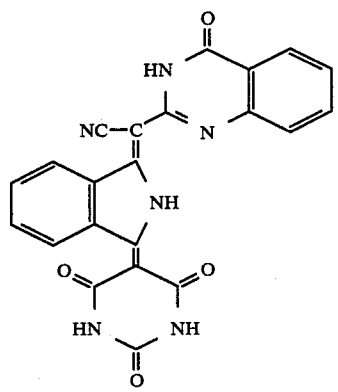

EXAMPLE 2

The procedure described in Example 1 is followed, but instead of 2-cyanomethylquinazol-4-one, 33 parts of malonodinitrile are used.

120 parts of an easily dispersible yellow pigment of the formula I, where A is —CN, are obtained; the pigment gives neutral yellow colorations.

EXAMPLE 3

19.4 parts of 1-(bis-cyanomethylene)-3-imino-isoindoline (prepared as described in Example 78a) of German Laid-Open Application DOS 1,670,748) and 13 parts of barbituric acid in 300 parts of glacial acetic acid are refluxed for 3 hours. The suspension is filtered and the product is washed with glacial acetic acid and finally with methanol. 28 parts of a yellow pigment of the formula I, where A is —CN, are obtained; the pigment has good fastness to migration and lightfastness, and gives colorations having a neutral yellow hue.

EXAMPLE 4

(a) Stage I (monocondensation product)

39 parts of 2-cyanomethyl-quinazolone and 29 parts of 1-amino-3-iminoisoindoline in 170 parts of methanol are refluxed for 5 hours. The precipitate is filtered off, washed with methanol and dried. Yield: 62 parts of 1-[cyano-(quinazolon-2′-yl)-methylene]-3-imino-isoindoline of melting point >300° C.

(b) Stage II 32 parts of the monocondensation product obtained as described in (a) and 13 parts of barbituric acid in 600 parts of glacial acetic acid are refluxed for 3 hours. The suspension is filtered and the product is washed with glacial acetic acid and methanol, and is dried.

Yield: 40 parts of pigment of the formula I, where A is

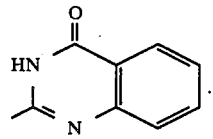

In PVC and polystyrene the pigment gives yellowish red colorations having good lightfastness. The pigment also has good fastness to migration.

We claim:

1. An isoindoline compound of the formula:

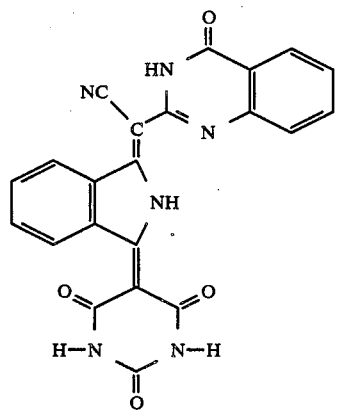

* * * * *